E. KISS.

Table-Bedstead.

No. 8,375. Reissued Aug. 13, 1878.

Witnesses.
Chas. Wahlers.
W. C. Hauff.

Inventor.
Emerick Kiss
by his attys
Van Santvoord & Hauff

N. PETERS, PHOTO-LITHOGRAPHER, WASHINGTON, D. C.

UNITED STATES PATENT OFFICE.

EMERICK KISS, OF NEW YORK, N. Y.

IMPROVEMENT IN TABLE-BEDSTEADS.

Specification forming part of Letters Patent No. 201,795, dated March 26, 1878; Reissue No. 8,375, dated August 13, 1878; application filed July 10, 1878.

*To all whom it may concern:*

Be it known that I, EMERICK KISS, of the city, county, and State of New York, have invented a new and useful Improvement in Folding Bedsteads, which improvement is fully set forth in the following specification, reference being had to the accompanying drawing, in which—

Figure 1:
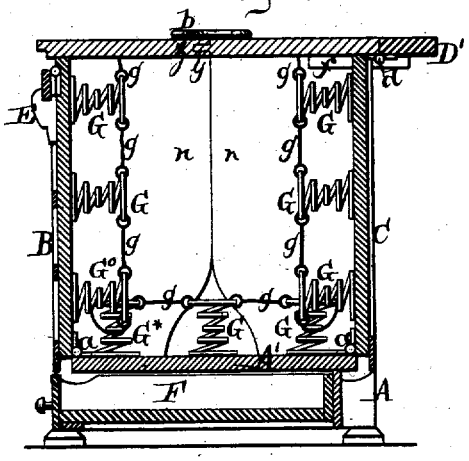
Figure 2:
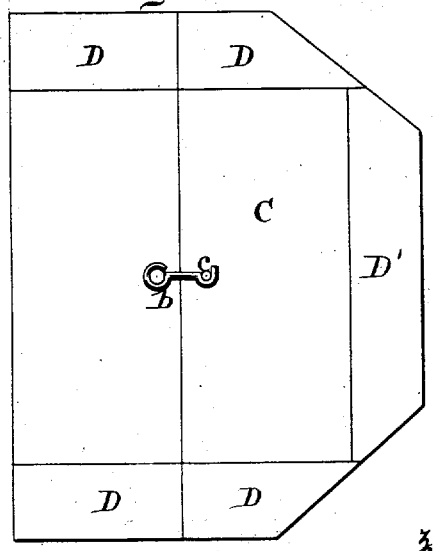
Figure 3:
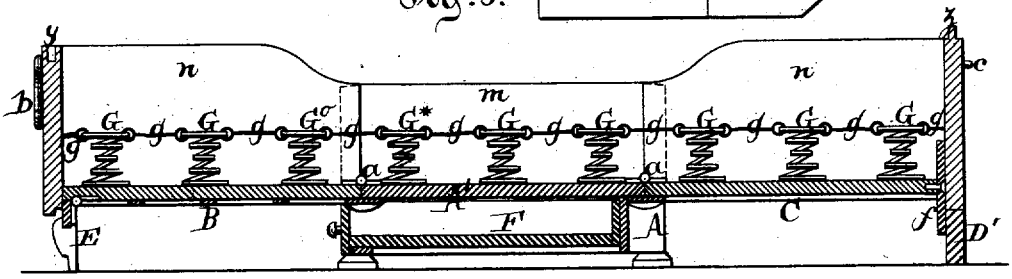
Figure 4:
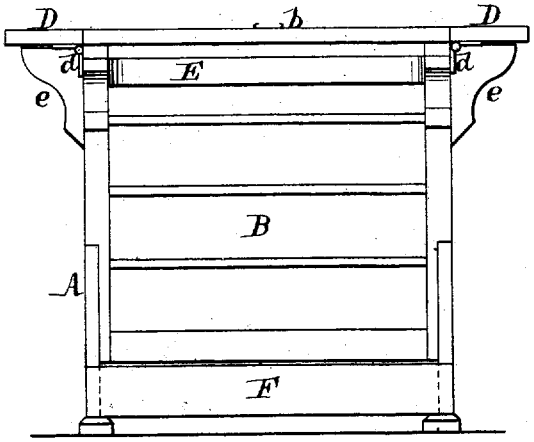
Figure 5:
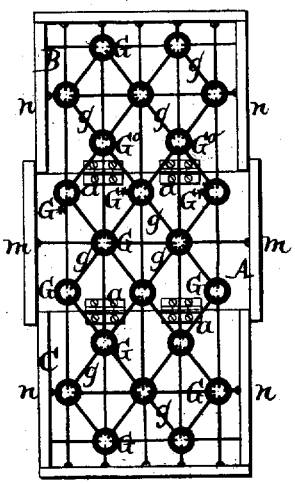

Figure 1 represents a vertical section of an article embracing my invention, the parts being in position to form a bureau or table. Fig. 2 is a plan or top view of the same. Fig. 3 is a vertical section of the same when unfolded to form a bedstead. Fig. 4 is a front view thereof when the parts are in position corresponding to Figs. 1 and 2. Fig. 5 is a plan or top view of the same when unfolded, on a smaller scale than the previous figures.

Similar letters indicate corresponding parts.

This invention consists in a bedstead which is composed of two or more sections, which are connected together by hinge-joints, each section being provided on its inner surface with a series of springs connected to each other and to the side boards of the bedstead by cords or bands, and arranged in alternate rows or positions, as hereinafter set forth, and in such relation to each other that when one of the sections is turned up to its folded position the springs situated next to the hinge-joints fit between the springs of the adjoining section, and when the sections are unfolded all the springs are steadied by connecting bands or cords, and a convenient support for the mattress is produced.

In the drawing, the letter A designates a base-frame. B C are two sections, and D D′ are leaves arranged according to my invention. The sections B C have the form of boxes open on one end, and they are connected at their open ends, by means of hinge-joints *a*, to the opposite ends of a platform, A′, which forms part of the base-frame A. The platform A′ is provided with side boards *m m*, which overlap the ends of the side boards *n n* of the sections B C, Figs. 3 and 5, so that no open spaces appear between the ends of said side boards when the sections B C are unfolded, and that the bed-clothes, sheets, or other parts are not liable to catch and become torn.

To one of the sections B or C is connected a hook, *b*, while the other section is provided with a pin or staple, *c*, which is intended to receive said hook when the sections are folded together, so as to hold the latter in position. This hook and staple may be located on the top or on either or both sides of the sections B C, as may be found most expedient.

The leaves D D are connected to the upper edges of the sections B C by means of hinge-joints *d*, and they are arranged on three sides of the section C, but only on two sides of the section B, thus leaving one edge or side of the latter free.

The leaves D are supported when extended by means of hinged braces *e*, while the leaf D′ is supported py a pivoted bar, *f*. This leaf D′ has two functions, namely, to form a table or a portion thereof, as shown in Figs. 1 and 2, and to form one of the feet of the bedstead, as seen in Fig. 3, the section B being provided with a foot, E.

In order to form a bureau, the sections B C are folded together, as seen in Fig. 1, the interior of the sections forming convenient receptacles for articles of bedding, while for the purpose of forming a table it is only necessary to raise the leaves D D′ and adjust the braces *e f* to the required position.

When it is desired to form a bedstead, the sections B C are spread apart or unfolded and allowed to rest on the floor, as seen in Figs. 3 and 5.

I provide the sections B C with a groove, *y*, and a tenon, *z*, at the edges where they join when folded; and in the base-frame A I arrange a drawer, F.

If desired, one of the sections B C may be made larger or wider than the other, in order to form an enlarged or head part of the bedstead; and the top of one section, moreover, may be so constructed as to overlap or cover the top of the other section.

To the platform of the base-frame A and to the inner surfaces of the sections B C, I secure a series of coiled springs, G, which, when the sections are unfolded, serve to form the support of a mattress. By referring to Fig. 5 it will be seen that said springs are connected to each other and to the side boards *m n* by cords

*g*, and that they are arranged in alternate rows or quincuncial position, and in such relation to each other that when the section B, for instance, is turned up to the position shown in Fig. 1, the springs G° of said section will pass between the springs G* G* of the platform A′, and when said section is unfolded all the springs will be steadied by the connecting bands or cords *g*, the cords which connect the springs G° G*, respectively, being then stretched precisely the same as if said springs would be placed on a continuous surface. Furthermore, when the section or sections are unfolded, the springs G form an unbroken support for the mattress, precisely the same as they would if all the springs were placed on a rigid support, since I am enabled to bring the springs G° and G* so close to the joint between the folding section and the platform A′ that when the folding section is turned down to the position shown in Figs. 3 and 5 the relative distances between the several springs will not be affected by the fact that the folding section is adapted to swing up to the position shown in Fig. 1.

This arrangement of springs is applicable to wardrobe-bedsteads where only one hinged section is used in combination with the base-frame, or to folding bedsteads composed of two or more sections.

What I claim as new, and desire to secure by Letters Patent, is—

The combination, with a folding bedstead, composed of two or more sections connected together by hinge-joints, of spiral springs attached to the inner sides of said sections, so as to be in alternate positions, and connected together and to the sides of the sections by cords or bands, all substantially as shown and described, whereby a continuous unbroken spring-support for a mattress is provided when the sections are unfolded to a horizontal plane, and when folded the said sections fit snugly and nicely together, and the position of the springs avoid their entanglement, as set forth.

In testimony that I claim the foregoing I have hereunto set my hand and seal this 29th day of June, 1878.

EMERICK KISS. [L. S.]

Witnesses:
W. HAUFF,
E. F. KASTENHUBER.